United States Patent [19]

Lenarduzzi

[11] Patent Number: 5,136,855
[45] Date of Patent: Aug. 11, 1992

[54] HEAT PUMP HAVING AN ACCUMULATOR WITH REFRIGERANT LEVEL SENSOR

[75] Inventor: Frank J. Lenarduzzi, Oakville, Canada

[73] Assignee: Ontario Hydro, Toronto, Canada

[21] Appl. No.: 664,885

[22] Filed: Mar. 5, 1991

[51] Int. Cl.⁵ .......................................... G01K 13/00
[52] U.S. Cl. ........................................ 62/129; 62/174; 62/324.4; 62/503; 62/260
[58] Field of Search .................. 62/218, 219, 220, 221, 62/83, 260, 238.6, 503, 125, 129, 205, 174, 210, 212, 224, 225, 149, 324.4

[56] References Cited

U.S. PATENT DOCUMENTS

| | | | |
|---|---|---|---|
| 1,880,653 | 10/1932 | Boars | 62/205 |
| 2,112,039 | 3/1938 | McLenegan | 62/225 X |
| 3,600,904 | 8/1971 | Tilney | 62/503 X |
| 4,730,465 | 3/1988 | Inoue | 62/125 X |
| 4,774,816 | 10/1988 | Uchikawa et al. | 62/324.1 |

Primary Examiner—Henry A. Bennet
Assistant Examiner—John Sollectto
Attorney, Agent, or Firm—Ridout & Maybee

[57] ABSTRACT

A ground source heat pump comprising an indoor coil circuit and an outdoor coil circuit utilizes a scroll compressor to pressurize the refrigerant. The outdoor coil may comprise ground coils formed from copper tubing into a spiral configuration. A charge control device controls the volume of refrigerant in the system in heating and cooling modes. A restrictor in parallel with a thermal expansion valve permits a base flow of refrigerant into the outdoor coil in heating mode. An accumulator is provided with a level switch controlling a solenoide value connected in parallel to a thermal expansion value feedig the indoor coil. The scroll compressor includes a discharge port operating in conjunction with a solenoid valve to trap high pressure refrigerant in the condenser circuit during compressor off cycles. Means for closing off one of the ground coils to reduce the effective length of the outdoor coil is provided.

4 Claims, 5 Drawing Sheets

HEAT PUMP HAVING AN ACCUMULATOR WITH REFRIGERANT LEVEL SENSOR

FIELD OF THE INVENTION

This invention relates to heat pumps. In particular, this invention relates to a ground source heat pump providing improved control means to increase efficiency, including means for maintaining a pressure differential between the condenser and evaporator circuits, means for increasing the proportion of gaseous refrigerant to liquid refrigerant circulating in the system and means for automatically increasing the refrigerant charge in the cooling mode and the decrease the refrigerant charge in heating mode.

BACKGROUND OF THE INVENTION

Ground source heat pumps are known for use in controlling temperatures in buildings and other structures. A typical ground source heat pump comprises an outdoor coil for transferring heat from or to the ground, an indoor coil for transferring heat from or to the environment sought to be controlled, and a compressor compressing a refrigerant, and thereby adding heat to the refrigerant, and discharging the refrigerant to either the outdoor coil or the indoor coil, depending upon the mode in which the heat pump is operating.

A number of problems have been presented by known heat pump designs. A typical heat pump utilizes a piston or reciprocating compressor which must be activated under equalized pressure conditions and gradually build up to the high pressure operating conditions of the condenser coil circuit. Thus, once the desired temperature has been reached in the indoor environment and the compressor is deactivated, the high pressure refrigerant in the condenser circuit must be permitted to equalize with the low pressure refrigerant in the evaporator circuit to enable the compressor to restart when the temperature of the controlled environment changes. This reduces efficiency of the heat pump by requiring the compressor to build up condenser circuit pressures after each startup. This further requires that the compressor remain off after deactivation for sufficient time to allow pressure equalization to occur.

A greater amount of refrigerant is required in the cooling mode than in the heating mode. In a typical heat pump the refrigerant charge must be increased manually when switch-over to the cooling mode becomes necessary. Insufficient refrigerant charge in the cooling mode reduces the efficiency of the heat pump.

Heat pumps are subject to "slugging" when the level of refrigerant exceeds an optimum level, so that the proportion of liquid refrigerant to gaseous refrigerant becomes too high resulting in overfeeding the accumulator. This can damage the compressor.

The present invention overcomes all of these disadvantages. The present invention utilizes a scroll compressor having a pressure dome with a check valve on the compressor discharge port which operates in conjunction with a solenoid valve to trap high pressure refrigerant in the condenser circuit and low pressure refrigerant in the evaporator circuit during off cycles. This improves the efficiency of the heat pump by obviating the need to rebuild condenser circuit pressure after each start-up, or to wait for pressure equalization between the condenser circuit and the evaporator circuit prior to restarting the compressor.

A solenoid valve controlled by suction pressure and accumulator refrigerant level is provided upstream of the evaporator (indoor coil) in cooling mode to facilitate the flow of refrigerant and alleviate a low suction pressure condition upon start-up.

A charge control device acts as a reservoir for excess refrigerant in the heating mode and automatically delivers refrigerant to the evaporator circuit in the cooling mode to increase the refrigerant charge as required to maximize efficiency.

To avoid "slugging" an accumulator is provided with a reed switch to control the level of refrigerant in the accumulator, and thus avoid a dangerously high proportion of liquid refrigerant to gaseous refrigerant circulating through the compressor. Further, a heat exchanger is provided whereby prior to compression cool refrigerant absorbs heat from warm refrigerant, thus decreasing the ratio of liquid refrigerant to gaseous refrigerant entering the accumulator.

SUMMARY OF THE INVENTION

The present invention thus provides a ground source heat pump having an indoor coil circuit including an indoor coil, and outdoor coil circuit including an outdoor coil, and a scroll compressor.

The present invention further provides a ground source heat pump wherein the outdoor coil comprises ground coils formed from copper tubing into a spiral configuration.

The present invention further provides a ground source heat pump including a charge control device comprising a reservoir surrounding a conduit, in which the conduit is coupled to the outdoor coil and the reservoir is coupled to the indoor coil circuit and the outdoor coil circuit.

The present invention further provides a ground source heat pump including a restrictor in parallel with a thermal expansion valve for permitting a base flow of refrigerant into the evaporator (outdoor) coil when the heat pump is in heating mode.

The present invention further provides a ground source heat pump including an accumulator for separating gaseous refrigerant from liquid refrigerant, having a level switch which, when the heat pump is in the cooling mode, controls a solenoid valve connected in parallel to a thermal expansion valve to permit a base refrigerant flow to the indoor coil when the refrigerant level in the accumulator drops below or rises above a preset level.

The present invention further provides a ground source heat pump in which the scroll compressor includes a discharge port having a check valve permitting only discharge flow from the discharge port, and a solenoid valve disposed between the outdoor coil circuit and the indoor coil circuit is activated in concert with the compressor to trap high pressure refrigerant in the condenser circuit during compressor off cycles.

The present invention further provides means for closing off one of the ground coils to reduce the effective length of the outdoor coil.

BRIEF DESCRIPTION OF THE DRAWINGS

In drawings which illustrate by way of example only a preferred embodiment of the invention.

DETAILED DESCRIPTION OF THE INVENTION

Figure 1:
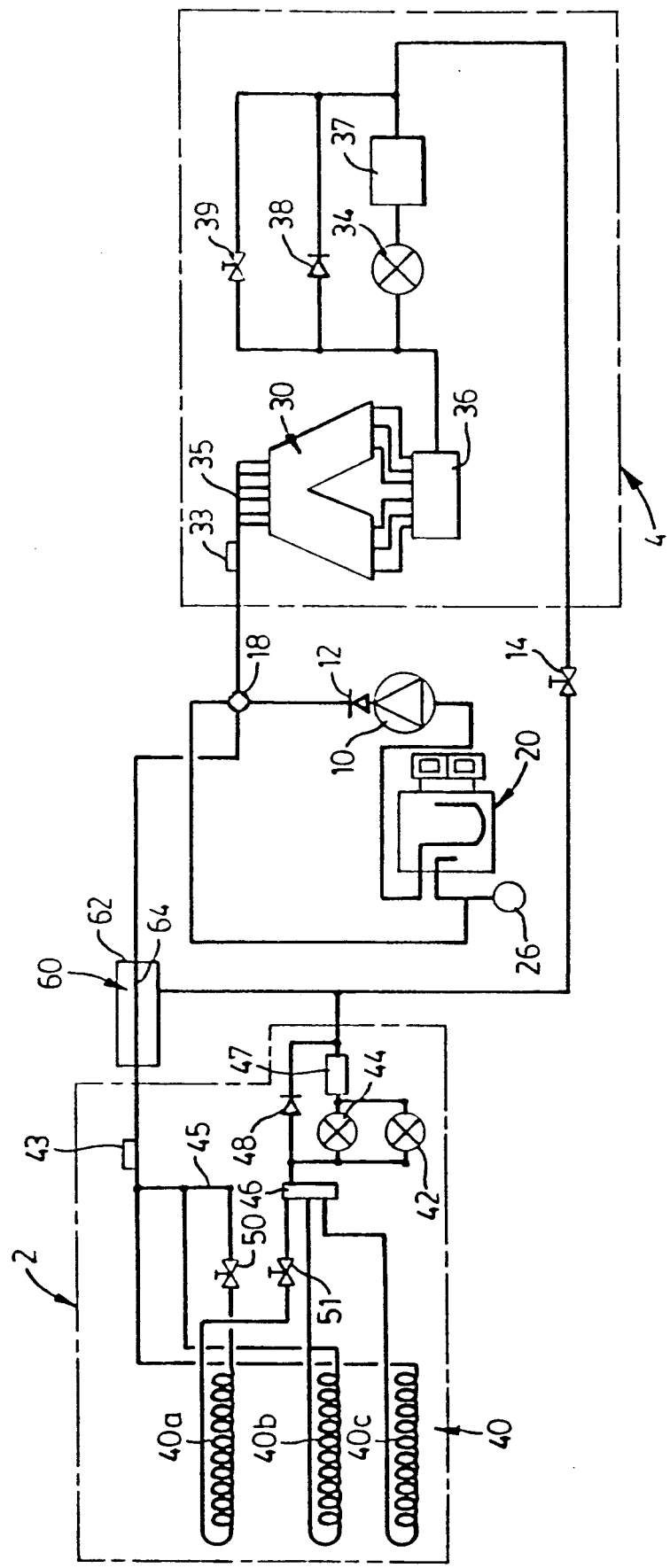
FIG. 1 is a schematic diagram of a heat pump according to the subject invention.

Referring to FIG. 1, the heat pump of the present invention comprises an outdoor coil circuit, generally designated 2, an indoor coil circuit, generally designated 4, and a scroll compressor 10.

The scroll compressor 10 provides advantages over piston compressors in operating efficiency and uniformity of gas flow. Most important for purposes of the present invention, the scroll compressor is capable of start-up under the high operating pressures of the condenser circuit.

In a preferred embodiment the scroll compressor 10 has a rated capacity of 34,000 BTU/H (2.8 tons) at 7° C. (45° F.) evaporating temperature and 54° C. (130° C.) condensing temperature. The discharge outlet of the compressor 10 is provided with a check valve 12, which acts in concert with a solenoid valve 14 disposed between the condenser and evaporator circuits to prevent pressure equalization between the condenser and evaporator circuits when the compressor 10 is off. The heat pump of the present invention therefore must utilize a scroll compressor since a piston compressor is unable to generate the high torque required to start-up under the high pressure conditions maintained in the condenser circuit.

The compressor inlet 16 is coupled to an accumulator 20, described in greater detail below, which separates the liquid and gaseous components of the refrigerant prior to compression to ensure that only gaseous refrigerant enters the suction port 16 of the compressor 10. The compressor discharge outlet is coupled to a ton reversing valve 18 for switching between heating and cooling modes.

Thermostatic control means of known design is provided to activate and deactivate the compressor 10, and to interrupt the operation of the heat pump if the refrigerant pressure becomes too high (above 350 p.s.i.) or too low (below 25 p.s.i.) or if the compressor discharge temperature rises above 138° C.

Figure 2:
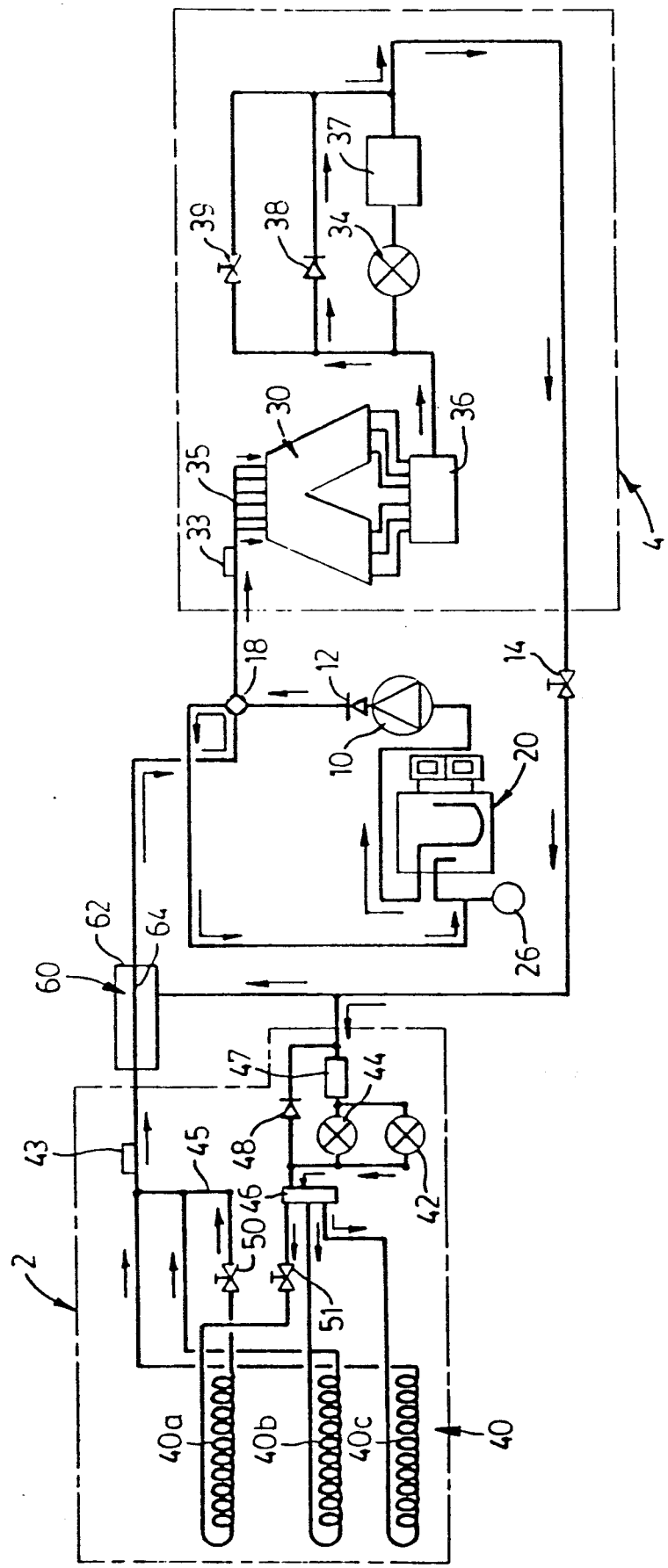
FIG. 2 is a schematic diagram of the heat pump of FIG. 1 illustrating the flow of refrigerant in the heating mode.

In the heating mode, the compressor 10 discharges into the indoor coil 30 which thus acts as a condenser, while the outdoor coil 40 acts as an evaporator and discharges into the accumulator 20, as shown by arrows in FIG. 2. In the cooling mode, the compressor 10 discharges into the outdoor coil 40 which thus acts as a condenser while the indoor coil 30 acts as an evaporator and discharges into the accumulator 20, as shown by arrows in FIG. 3.

The outdoor coil 40 is provided with a manually operated expansion valve 42, preset to permit a base flow of refrigerant to the distributor 46, connected in parallel to a one ton thermal expansion valve 44 controlled by the temperature of the refrigerant as it is discharged from the coil 40. In the heating mode, performance of the thermal expansion valve 44 is optimized by selection of the correct position for the hand expansion valve 42, or a fixed restrictor such as a capillary tube may be used in place of the hand expansion valve if the desired opening for base refrigerant flow to the outdoor coil 40 is known. This will reduce the temperature change resulting from a change in the rate of refrigerant flow through the thermal expansion valve 44, and avoid the problem of "hunting" (a feedback condition in which the thermal expansion valve oscillates in response to changing temperatures detected by its controlling thermostat) that would occur utilizing only a thermal expansion valve.

Furthermore, the thermal expansion valves 34, 44 are preferably the type having external equalization (pressure compensated), to automatically compensate for the pressure drop across the evaporator coil.

When the coil is acting as a condenser, refrigerant enters the coil through the coil manifold 35, 45. The expansion valve 34, 44 is bypassed through a check valve 38, 48 connected in parallel to the expansion valve 34, 44 to permit the free flow of warm refrigerant into the evaporator circuit. When the coil is acting as an evaporator, refrigerant discharged from the condenser coil flows through a filter/dryer 37, 47 of known design into the expansion valves 42, 44 or 34 for cooling prior to entering the coil.

The indoor coil 30 is an "A" coil of known design. The outdoor coil 40 preferably comprises three spiral copper ground coils 40a, 40b, 40c in direct contact with the ground. Each of the three ground coils 40a, 40b, 40c is formed from one-half inch diameter copper tubing into a spiral approximately 46 cm (18 in.) in diameter, having an effective length of approximately 61 m (200 ft.). This construction provides a higher inherent ground coil efficiency, reduced land area use and lower installation costs than conventional ground coils (which typically consist of a plastic pipe carrying in a secondary fluid that requires a second circulating pump and heat exchanger to transfer the heat from the antifreeze to the refrigerant). The heat pump using an outdoor coil 40 of this design is charged with approximately 6 to 7 kilograms of chlorodiflouromethane as refrigerant.

Other coil configurations will be effective. Preferably the ground coils are formed from one-half or five-eights inch tubing, or a combination of the two, and have an effective length of about 61 m (200 ft.) for each ton of heat pump capacity.

The ground coils 40a, 40b, 40c are buried in three separate trenches approximately 1.8 m. (6 ft.) and 17 m (55 ft.) long. To improve thermal conductivity each ground coil is covered with a backfill comprising either backfill sand, limestone screenings (crushed limestone), or fluidized backfill consisting of sand, cement and flyash. Excavated clay soil is used to backfill to grade. The soil preferably has a thermal conductivity of about 1 W/(m-°C.), a density of about 2,000 kg/m³ and a specific heat of about 0.9 KJ/(kg-°C). The outdoor coil distributor 46 should meter equal amounts of refrigerant into each ground coil 40a, 40b, 40c.

Figure 5:
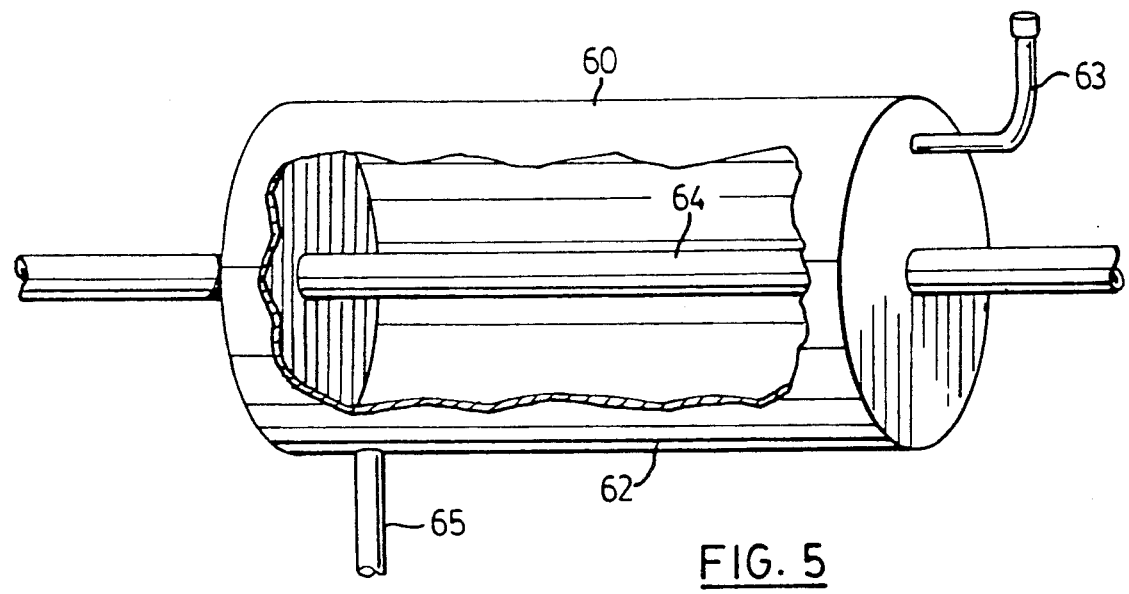
FIG. 5 is a partly cut-away elevation of the charge control device.
Figure 6:
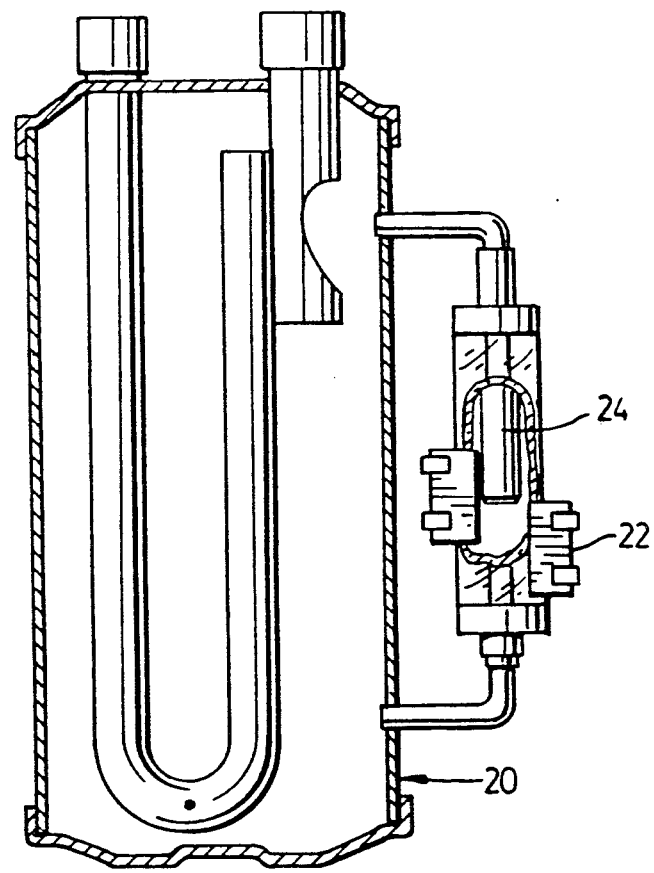
FIG. 6 is a sectional view of the accumulator.

A charge control device 60 is provided to automatically increase the amount of refrigerant in the system when the heat pump is in the cooling mode. The charge control device 60, illustrated in FIG. 5, comprises a reservoir 62 surrounding a conduit 64 coupled to the outdoor coil manifold 45. In heating mode, cool refrigerant discharged from the outdoor coil 40 and passing through the conduit 64 attracts warm refrigerant discharged from the indoor coil 30, which migrates to and condenses in the reservoir 62 and is effectively removed from the system. When the heat pump is switched to cooling mode, hot refrigerant from the compressor discharge port 12 flows through the conduit 64 to the outdoor coil 40, boiling out refrigerant held in the reservoir 62 which thus discharges through drainage conduit 65 and combines with warm refrigerant feeding into the indoor coil 30, raising the refrigerant charge circulating in the system. An access conduit 63 with a valve (not shown) is coupled to the reservoir for charging the system with refrigerant. The charge control device 60 may be mounted horizontally, as illustrated in FIG. 5, or vertically, so long as drainage conduit 65 is located at the bottom of the reservoir 62.

The reservoir 62 in the charge control device 60 holds approximately 1.5 kilograms of subcooled refrigerant at evaporator circuit temperatures and condenser circuit pressures. The refrigerant in the reservoir 62 is normally used to increase the amount refrigerant in the system in the cooling mode, as described above, but also tends to migrate into the outdoor coil 40 during compressor off-cycles to boost start-up performance in the heating mode.

It is advantageous to provide one of the ground coils 40a, 40b, 40c with solenoid valves 50, 51, to reduce the effective length of the outdoor coil 40 when the heat pump is switched from heating mode to cooling mode at a time when the ground is still relatively cold, for example in early spring. Since the refrigerant tends to migrate to the coolest portion of the system, closing valves 50 and 51 after each heating cycle under these conditions will prevent a refrigerant deficiency in the evaporator circuit 4 that would reduce the efficiency of the heat pump.

An accumulator 20 is provided with a float-type level switch 22 having a reed switch (not shown) which can be adjusted to the level of refrigerant desired in the accumulator 20, particularly to facilitate start-up in the cooling mode and to control "slugging" in general operation. In cooling mode, when the level of refrigerant in the accumulator 20 is below the preset level the level switch 22 is deactivated and a solenoid valve 39 connected in parallel with the expansion valves 32, 34 of the indoor coil 30 remains open to permit a larger base refrigerant flow into the indoor coil 30 and thus facilitate start-up. When the accumulator refrigerant level exceeds the preset level, the level switch 22 is activated and closes the solenoid valve 39 in order to reduce base refrigerant flow to the indoor coil 30. Sight windows 24 may be provided to give a visual indication of refrigerant level.

In addition, the solenoid valve 39 is controlled by a differential pressure switch 26 set to open the valve 39 if suction pressure in the evaporator circuit drops below a preset value, preferably approximately 35 p.s.i. The pressure switch 26 will close the solenoid valve 39 if the suction pressure increases to another preset value, preferably 60 p.s.i. However, if the refrigerant level in the accumulator 20 exceeds the preset value the level switch 22 will supercede any signal delivered by the pressure switch 26, to close the valve 39 as a safeguard against over-feeding the compressor 10.

A solenoid valve 14 is provided between the condenser circuit output and evaporator circuit input, in order to prevent pressure equalization between the condenser and evaporator circuits during compressor off cycles. The solenoid valve 14 closes as the compressor 10 is deactivated, acting in concert with the check valve 12 on the compressor discharge port to isolate and trap warm (high pressure) refrigerant in the condenser circuit. The check valve 12 permits the compressor dome to equalize to the suction pressure in the evaporator circuit. This permits compressor start-up with little increase in starting torque, and only a small delay in rebuilding condenser pressures within the compressor dome. A piston or reciprocal compressor would require a significant increase in starting torque in such a system, since it would be required to compress immediately into condenser circuit pressures without an opportunity to build to operating speed and inertia. It will be apparent that utilizing the scroll compressor 10 in concert with the solenoid valve 14 also obviates the need to wait for pressure equalization to occur before restarting the compressor 10.

Figure 3:
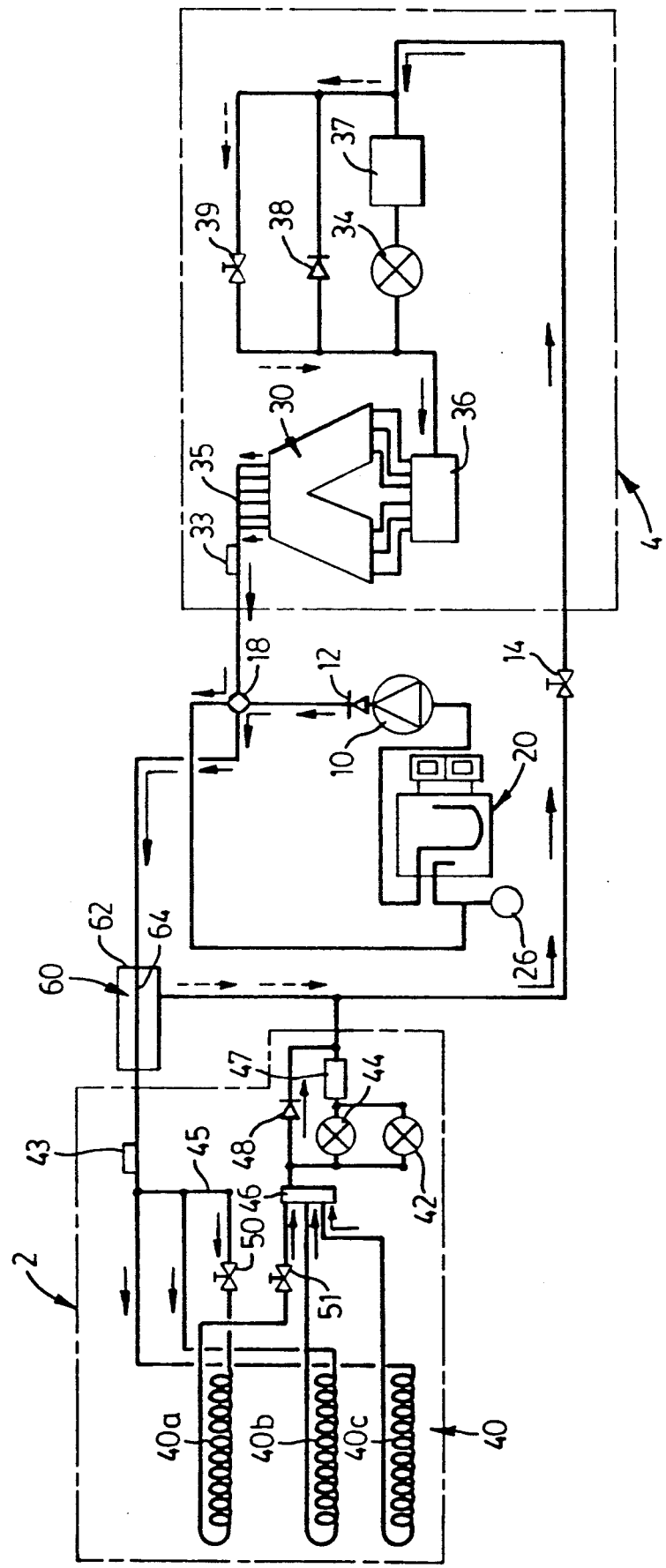
FIG. 3 is a schematic diagram of the heat pump of FIG. 1 illustrating the flow of refrigerant in the cooling mode.
Figure 4:
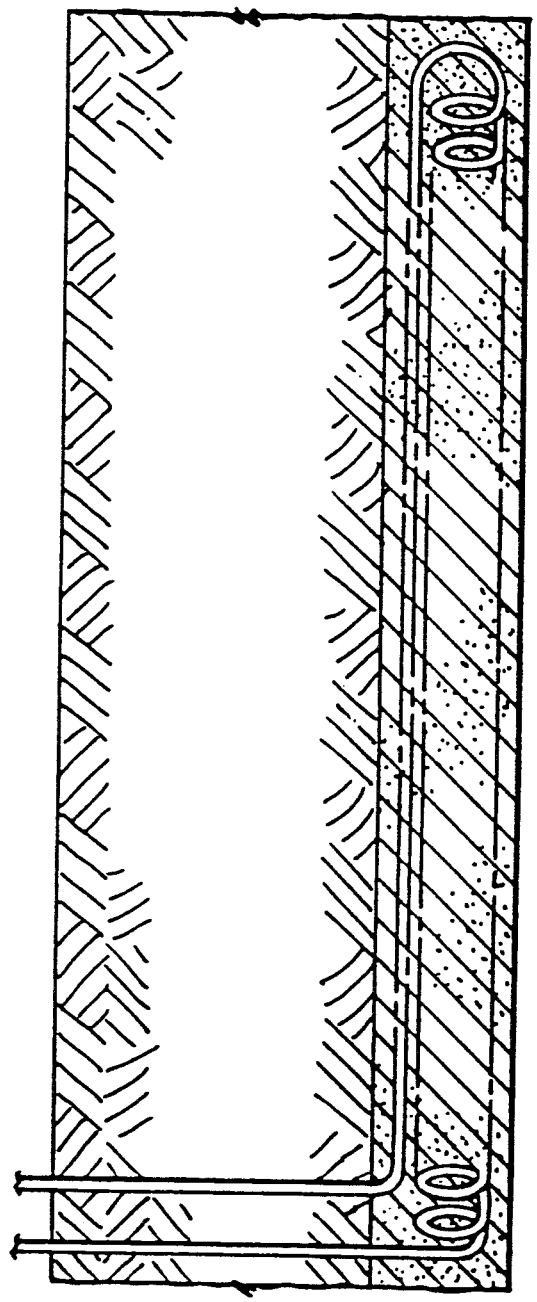
FIG. 4 is an elevation of a preferred ground coil.

The flow of refrigerant in operation of the heat pump of the present invention in heating and cooling modes is illustrated by the arrows in FIGS. 2 and 3, respectively.

Referring to FIG. 2, in heating mode the compressor 10 discharges hot refrigerant into the indoor coil manifold 35. A blower of conventional design removes heat from the refrigerant as it flows through the indoor coil 30, warming the indoor environment and partially condensing the refrigerant. Warm refrigerant is discharged from the indoor coil 30 through the distributor 36 and check valve 38 to the heat exchanger.

Unless the reservoir 62 in the charge control device 60 is full, some warm refrigerant will migrate to the reservoir 62. The remaining refrigerant is discharged through the filter/dryer 47. A preset volume of refrigerant travels through the hand expansion valve or fixed restrictor 42. Additional refrigerant travels through the thermal expansion valve 44, which is controlled by a thermostat 43 and responsive to the temperature of refrigerant discharged from the outdoor coil 40.

A significant pressure drop and thus cooling of the refrigerant occurs across the expansion valves 42, 44, from which cool refrigerant is discharged through the distributor 46 into the outdoor coils 40 where it absorbs heat from the ground through the ground coils 40a, 40b, 40c. The refrigerant flows through the outdoor coil manifold 45 where its temperature is measured by the thermostat 43 controlling the thermal expansion valve 44. The refrigerant flows through the conduit 64 of the charge control device 60 prior to entering the accumulator 20. The gaseous component is separated from the liquid component in the accumulator 20, and the gaseous refrigerant is suctioned into the compressor 10 as the process continues.

In the cooling mode, illustrated in FIG. 3, the compressor 10 discharges hot refrigerant through the conduit 64 of the charge control device 60, boiling out any refrigerant remaining in the reservoir 62 from the heating mode or the last compressor off cycle, and flows through the outdoor coil manifold 45 into the outdoor coil 40. The hot refrigerant delivers heat through the ground coils 40a, 40b, 40c to the ground, partially condensing in the process. Warm refrigerant discharges through the distributor 46 and the check valve 48, bypassing the expansion valves 42, 44. The refrigerant flows through the solenoid valve 14 and through the filter/dryer 37. Under the conditions described above a base flow of warm refrigerant flows through the solenoid valve 39, and the remaining refrigerant flows through the thermal expansion valve 34, which is controlled by a thermostat 33 responsive to the temperature of refrigerant discharged from the indoor coil 30.

The pressure drop across the expansion valve 34 cools the refrigerant, which flows through the indoor coil 30. Blower means passes air through the indoor coil 30, causing the refrigerant to absorb heat from the indoor environment, and the refrigerant is discharged through the indoor coil manifold 35 and through the reversing valve 18. The refrigerant is then fed into the accumulator 20 for separation and the cycle continues.

I claim:

1. A ground source heat pump having an indoor coil circuit including an indoor coil, an outdoor coil circuit including an outdoor coil, and a scroll compressor, including an accumulator for separating gaseous refrigerant form liquid refrigerant, having a level switch which, when the heat pump is in the cooling mode, controls a solenoid valve connected in parallel to a thermal expansion valve to change a base refrigerant flow to the indoor coil when the refrigerant level in the accumulator drops below or rises above a preset level.

2. A heat pump as defined in claim 1, in which the solenoid valve is further controlled by a differential pressure switch detecting suction pressure at the accumulator inlet.

3. A heat pump as defined in claim 2, in which the solenoid valve is opened by the pressure switch when the suction pressure at the accumulator inlet drops below about 35 p.s.i. and is closed by the pressure switch when the suction pressure at the accumulator inlet rises above about 60 p.s.i.

4. A heat pump as defined in claim 1, in which the accumulator includes a sight window providing a visual indication of refrigerant level.

* * * * *